(12) United States Patent
Donaldson

(10) Patent No.: US 7,249,325 B1
(45) Date of Patent: Jul. 24, 2007

(54) AUTOMATICALLY CENTERED SCROLLING IN A TAB-BASED USER INTERFACE

(75) Inventor: Jesse Donaldson, Sunnyvale, CA (US)

(73) Assignee: Palmsource, Inc., Sunnyvale, CA (US)

( * ) Notice: Subject to any disclaimer, the term of this patent is extended or adjusted under 35 U.S.C. 154(b) by 0 days.

(21) Appl. No.: 09/569,739

(22) Filed: May 11, 2000

(51) Int. Cl.
  *G06F 3/00* (2006.01)
  *G06F 3/14* (2006.01)
(52) U.S. Cl. ............... 715/777; 715/784; 715/810; 715/864; 345/169; 345/173
(58) Field of Classification Search ............... 345/767, 345/776, 777, 784, 785, 786, 802, 810, 828, 345/829, 830, 833, 834, 835, 864, 169, 173; 715/767, 776, 777, 784–786, 802, 810, 828–830, 715/833–835, 864
See application file for complete search history.

(56) References Cited

U.S. PATENT DOCUMENTS

| | | | | |
|---|---|---|---|---|
| 5,668,964 A | * | 9/1997 | Helsel et al. | 345/776 |
| 5,745,716 A | * | 4/1998 | Tchao et al. | 715/777 |
| 5,940,076 A | * | 8/1999 | Sommers et al. | 345/834 |
| 6,020,881 A | * | 2/2000 | Naughton et al. | 345/740 |
| 6,097,391 A | * | 8/2000 | Wilcox | 345/776 |
| 6,154,209 A | * | 11/2000 | Naughton et al. | 715/764 |
| 6,184,884 B1 | * | 2/2001 | Nagahara et al. | 345/828 |
| 6,433,801 B1 | * | 8/2002 | Moon et al. | 345/840 |
| 6,448,987 B1 | * | 9/2002 | Easty et al. | 715/834 |
| 6,538,635 B1 | * | 3/2003 | Ringot | 345/156 |
| 6,580,442 B1 | * | 6/2003 | Singh et al. | 715/840 |
| 2003/0071848 A1 | * | 4/2003 | Carroll | 345/776 |

OTHER PUBLICATIONS

"Graphical Notebook Control Tab Scroll Button Action Settings", Sep. 1, 1992, IBM, vol. 35, No. 4B, pp. 371-372.*
"Scrolling Tab Feature for a Notebook Control", Jul. 1996, IBM, vol. 39, No. 7, pp. 73-74*

(Continued)

*Primary Examiner*—Lucila X. Bautista
(74) *Attorney, Agent, or Firm*—Berry & Associates P.C.

(57) ABSTRACT

A method and apparatus for presenting a tab-based graphic user interface (GUI) having more tabs than can be fitted across a screen side for a computer system. The computer system can be handheld devices such as personal digital assistants (PDA's) and cell phones. The tab-based GUI displays as many tabs as possible on the screen side. The on-screen tabs are arranged in a sequence on a side of the display screen wherein each of these displayed tabs is adapted to be selected by a user for entering into a file category. The off-screen and on-screen tabs form a circular array conceptually such that a portion of the circular array being displayed on the screen side is the sequence of the on-screen tabs. In response to the selection of a on-screen tab, the selected on-screen tab is automatically scrolled to the center position of the screen side. In response to the selection of another on-screen tab, the newly selected on-screen tab is automatically scrolled to the center position of the screen side. Any tab, whether on-screen or off-screen, can eventually be selected by repeatedly selecting a tab on-screen on the left-most position of the screen side until the desired tab is on-screen for selection.

27 Claims, 13 Drawing Sheets

OTHER PUBLICATIONS

"Welcome to Jean-Francois Brouillet's home page", Aug. 8, 1997, JFB's Site, pp. 1-3.*

"System Notebook Visual Rendition", Jul. 1, 1992, IBM, vol. 35, No. 2, pp. 225-226.*

"Graphical Notebook View of the Distributed System Namespace", Jul. 1, 1992, IBM, vol. 35, No. 2, pp. 310-311.*

Bill N. Schilit et al, "The PARCTAB Mobile Computing System", 1993, IEEE, pp. 34-39.*

* cited by examiner

100a

100b

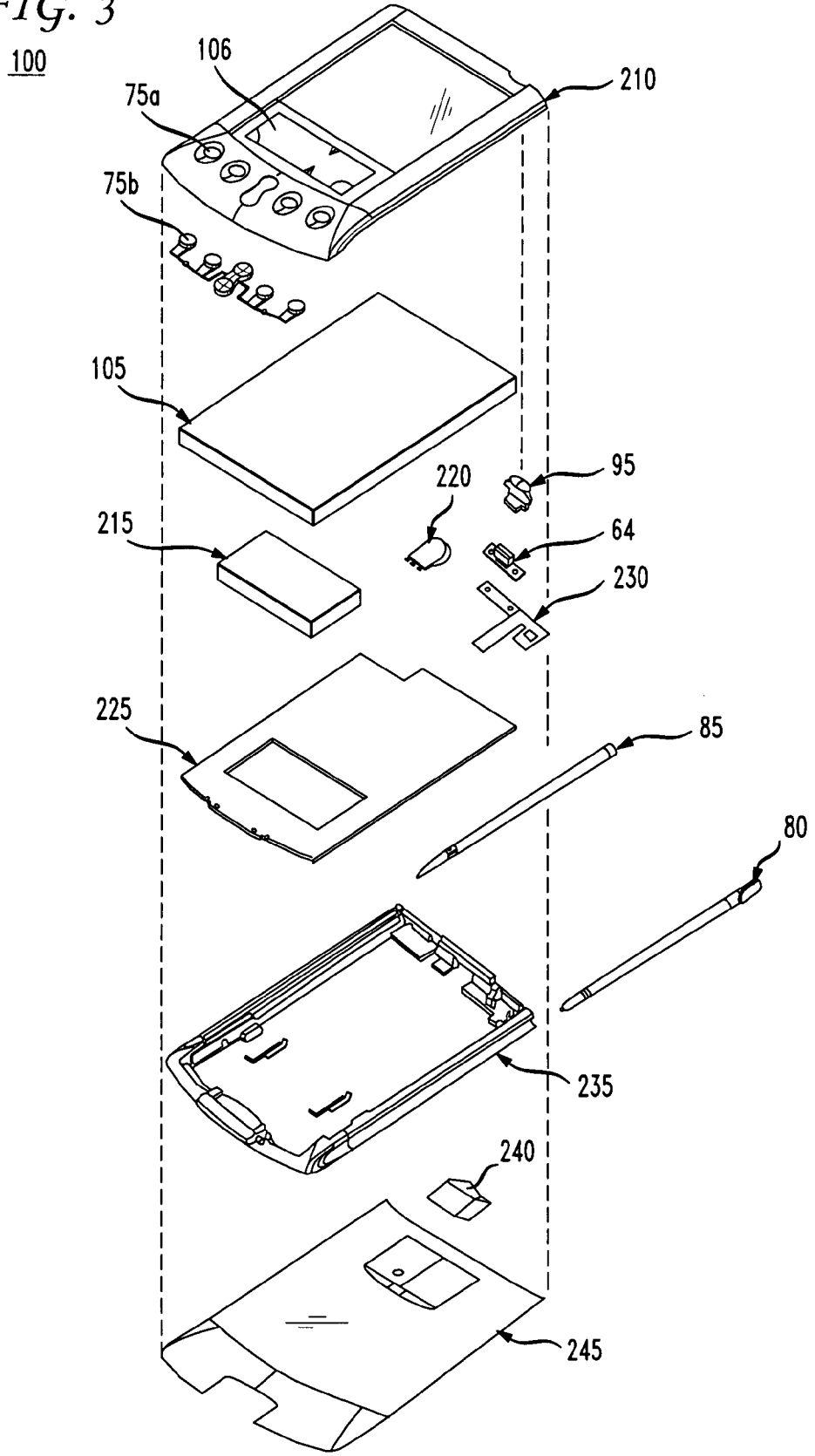

AUTOMATICALLY CENTERED SCROLLING IN A TAB-BASED USER INTERFACE

FIELD OF THE INVENTION

The present invention relates to the field of handheld devices. In particular, the present invention relates to a graphic user interface (GUI) well suited for display on handheld devices.

BACKGROUND

In comparison to a typical computer monitor, a handheld device's display screen is more restricted in the amount of information that can be displayed. As such, for a handheld device, efficient use of display area is a non-trivial and pressing issue. Specifically, a general file/folder structure usually implemented for display on a typical computer monitor, is not well suited for display on a handheld device. Thus, for a handheld device to display information with a file/folder structure, a tab-based GUI can facilitate the display of information on a handheld device. In this capacity, the tab-based GUI organizes different files/folders as categories for presentation on the small display screen of the handheld device. These categories are graphically represented as tabs without introducing a large "footprint" on the small display screen.

In particular, users need to be able to switch categories presented on the display screen of a handheld device quickly and easily. Thus, using tabs at the top of the screen to navigate between categories facilitates this end. However, the tab-based GUI can still be somewhat inconvenient if there are more tabs than will fit on the screen at once. What is unresolved is: how to find tabs that do not fit on the display screen.

Prior art approaches add additional GUI elements (such as scroll arrows) to scroll the tabs left and right in order to view all of the tabs. Alternatively, multiple rows of tabs can be displayed. Unfortunately, these prior art solutions leave too large a footprint on the display screen, obscuring other information from being displayed or are inconvenient to use. Thus, these prior art approaches do not provide an acceptable solution for the small screens of handheld devices.

Specifically, these prior art approaches require additional GUI elements, which can be problematic when using small screens. Also, these elements are often small, and therefore harder to activate (by stylus or mouse). Moreover, some implementations always scroll an entire screen width at once. On these systems, if only one more tab exists than will fit on the screen, then a whole screen with the one extra tab will be displayed when the screen is scrolled. Only one tab is on-screen while the remaining majority of tabs are not on-screen. As such, screen area is not efficiently utilized.

SUMMARY

A need exists for a graphic user interface (GUI) that does not leave a "large footprint" on the display screen of a handheld device. A further need exists for a GUI tailored to a handheld device's display screen to select any category efficiently without relying on scrolling an entire screen width at once. Yet another need exists for a GUI tailored to a handheld device's display screen while without using small elements that are difficult to activate by stylus or mouse.

The present invention provides a tab-based GUI that does not waste precious display area on the display screen of a handheld device. The present invention further provides a GUI tailored to a handheld device's display screen to select any category efficiently without relying on scrolling an entire screen width at once. The present invention also provides a GUI tailored to a handheld device's display screen without using small elements that are difficult to activate by a stylus or mouse.

In one embodiment, for a tab-based GUI having more tabs than can fit across a screen dimension for a computer system, as many tabs as possible are displayed on the screen dimension. The tabs on-screen are arranged in a sequence wherein each of these on-screen tabs is adapted to be selected by a user for entering into a file category. In response to the selection of a tab on screen, the selected tab on screen is automatically scrolled to the center position of the screen dimension. In response to the selection of another tab on screen, the newly selected tab on screen is automatically scrolled to the center position of the screen dimension. The computer system can be a handheld device such as a PDA or a cell phone.

In one embodiment, the off-screen tabs together with the on-screen tabs form a circular array conceptually such that a portion of the circular array being displayed on the screen dimension contains at its center the last-selected tab. As such, whether on-screen or off-screen, any tab can be eventually selected by repeatedly selecting the right-most tab on screen. Similarly, any tab can be eventually selected by repeatedly selecting the left-most tab on screen. In one embodiment, the currently selected on-screen tab is visibly high lighted.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings which are incorporated in and form a part of this specification, illustrate embodiments of the invention and together with the description, serve to explain the principles of the invention:

FIG. 3 is an exploded view of the components of the palmtop computer system of FIG. 2A.

DETAILED DESCRIPTION OF THE FIGURES

Figure 1:
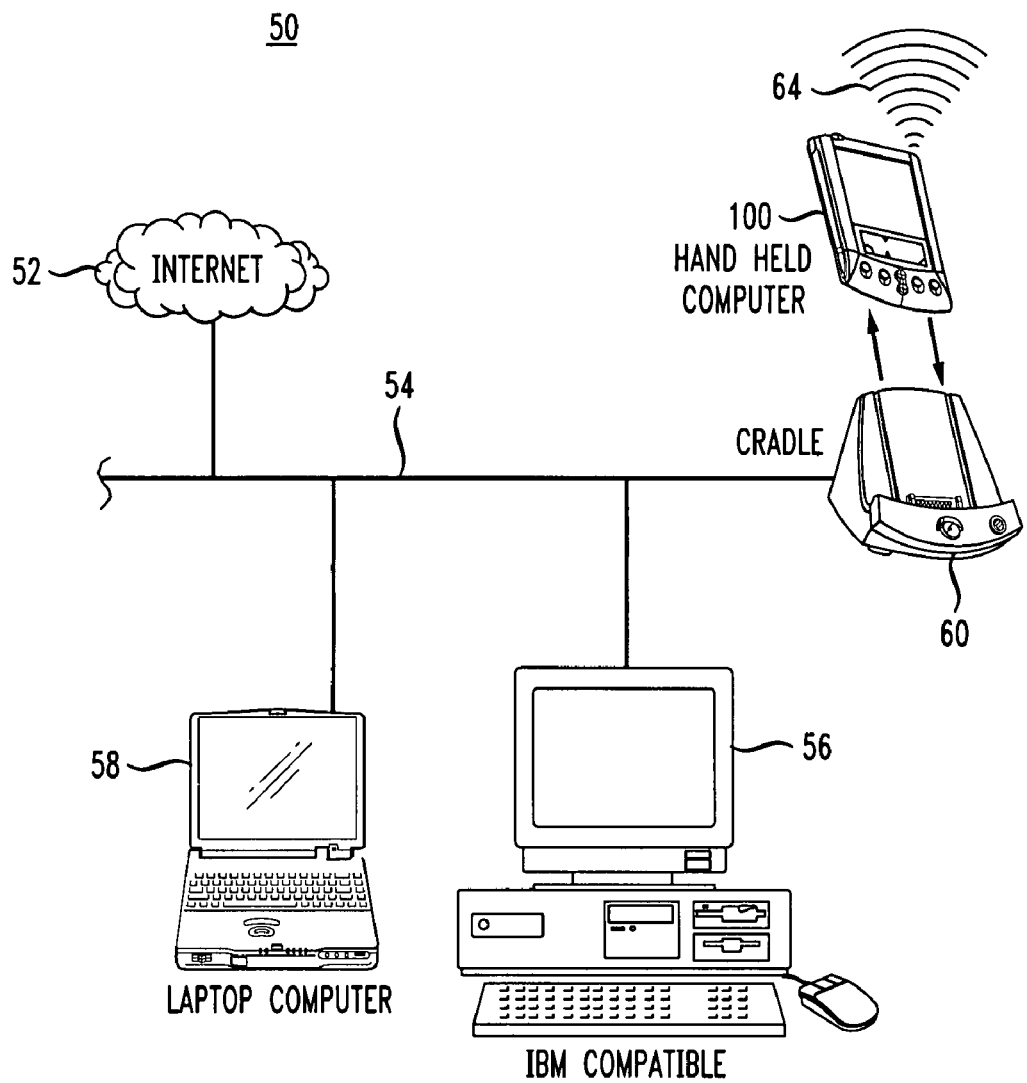
FIG. 1 is system illustration of a handheld device as a palmtop or "palm sized" computer system connected to other computer systems and the Internet via a cradle device.

Reference will now be made in detail to the preferred embodiments of the invention, a tab-based graphic user interface (GUI) for a handheld device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature:

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Platform for Handheld Devices:

FIG. 1 illustrates a system 50 comprising computer systems (56, 58 and 100) upon which embodiments of the present invention may be practiced. Specifically, host computer system 56 can either be a desktop unit as shown, or, alternatively, can be laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system such as handheld computer system 100. Cradle 60 provides an electrical and mechanical communication interface between bus 54 (and anything coupled to bus 54) and computer system 100 for two way communications. Computer system 100 also contains a wireless infrared communication mechanism 64 for sending and receiving information from other devices.

Figure 2A:
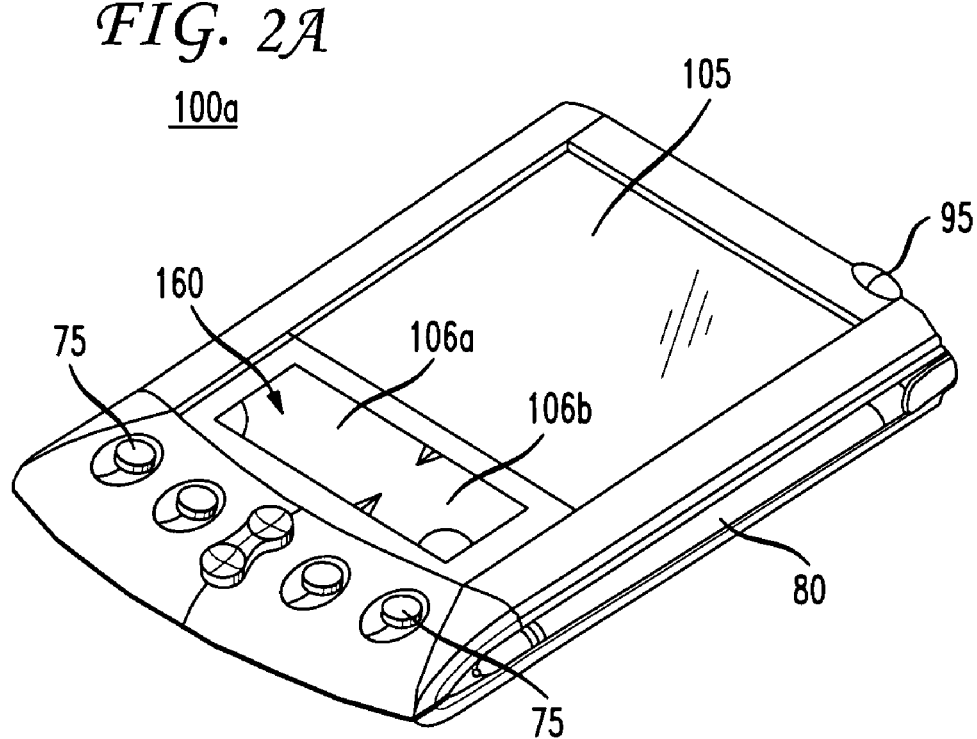
FIG. 2A is a top side perspective view of a handheld device as a palmtop computer system that can be used as a platform for the graphic user interface (GUI) embodiments of the present invention.

FIG. 2A is a perspective illustration of the top face 100a of one embodiment of the palmtop computer system. It is appreciated that the GUI of the present invention can be realized on any number of computer systems and that system 100 is exemplary only. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing numeric characters). The stylus 80 is used for stroking a character within one of the regions 106a and 106b. The stroke information is then fed to an internal processor for automatic character recognition.

Once characters are recognized, they are typically displayed on the screen 105 for verification and/or modification.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (see FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (see FIG. 5) for later analysis.

Figure 2B:
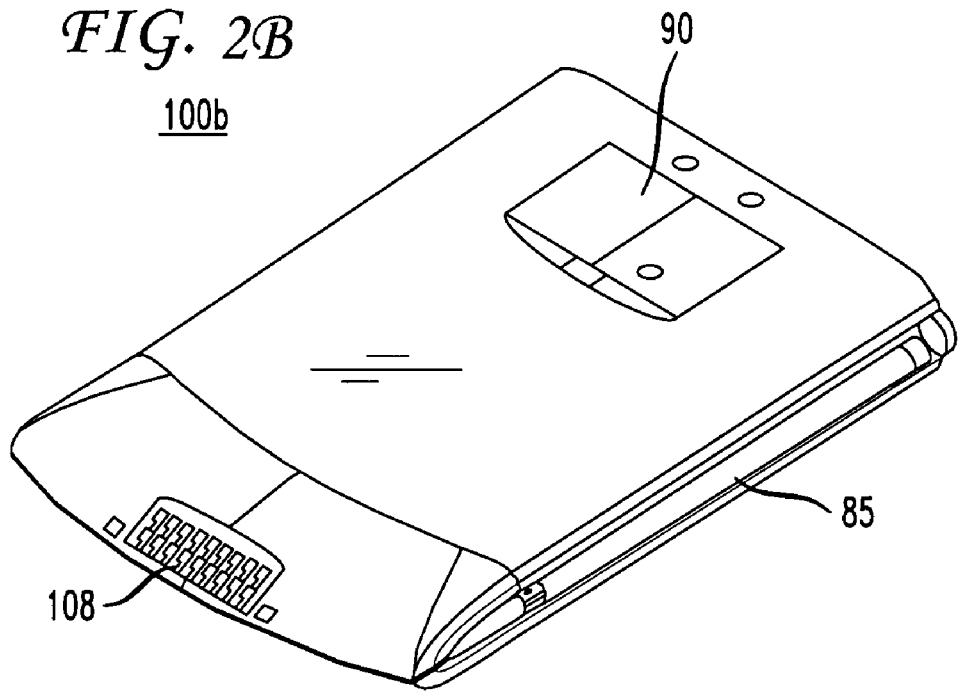
FIG. 2B is a bottom side perspective view of the palmtop computer system of FIG. 2A.

FIG. 2B illustrates the bottom side 100b of one exemplary embodiment of the palmtop computer system. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

FIG. 3 is an exploded view of exemplary palmtop (handheld) computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. The touch screen can be a digitizer. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
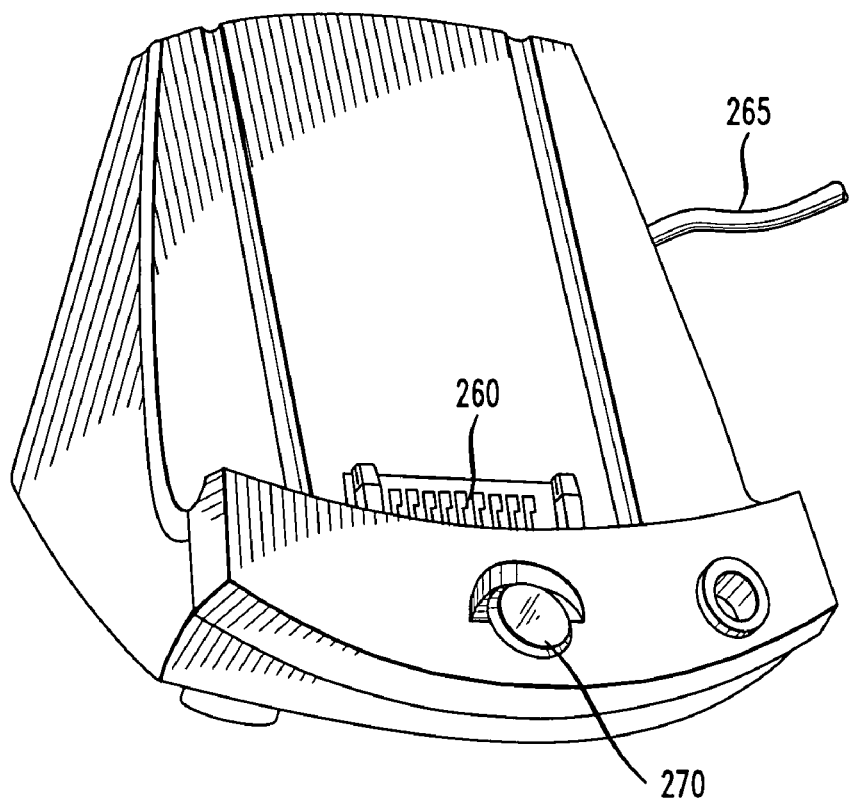
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 3B) of computer system 100 when system 100 is slid into the cradle 60 in an upright position. Once inserted, button 270 can be pressed to initiate two way communication between system 100 and other computer systems coupled to serial communication 265.

Figure 5:
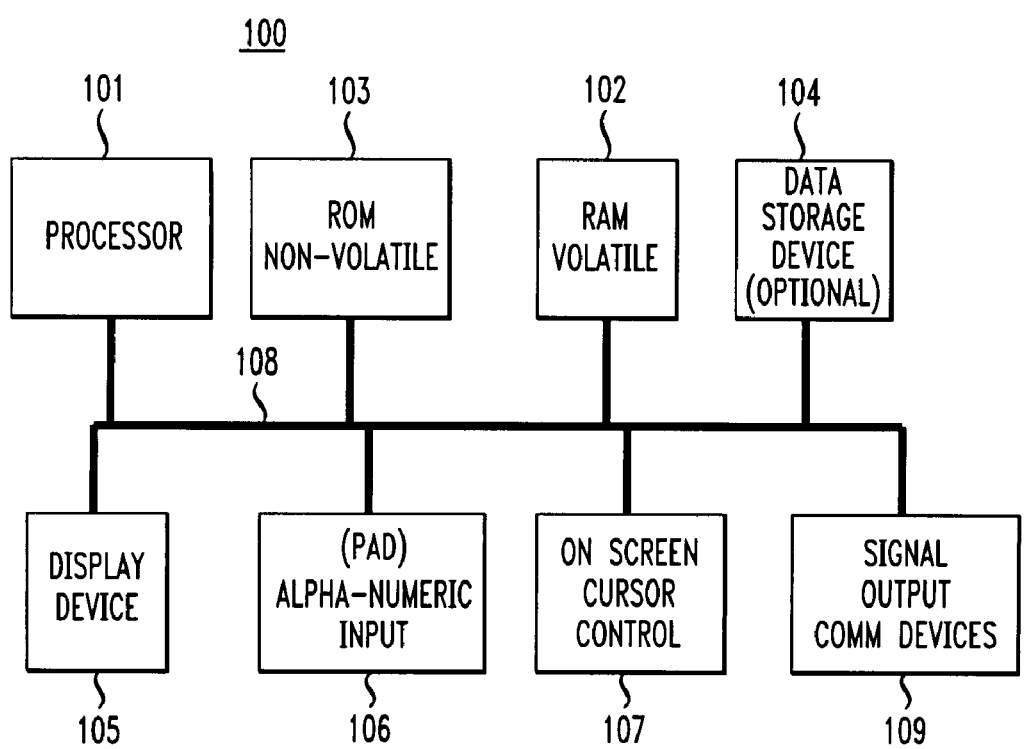
FIG. 5 is a logical block diagram of the palmtop computer system in accordance with an embodiment of the present invention.

FIG. 5 illustrates circuitry of exemplary computer system 100, some of which can be implemented on PC board 225. Computer system 100 includes an address/data bus 108 for communicating information, a central processor 101 coupled with the bus for processing information and instructions, a volatile memory 102 (e.g., random access memory RAM) coupled with the bus 108 for storing information and instructions for the central processor 101 and a non-volatile memory 103 (e.g., read only memory ROM) coupled with the bus 108 for storing static information and instructions for the processor 101. Computer system 110 also includes an optional data storage device 104 (e.g., memory stick) coupled with the bus 108 for storing information and instructions. Device 104 can be removable. As described above, system 100 also contains a display device 105 coupled to the bus 108 for displaying information to the computer user. PC board 225 can contain the processor 101, the bus 108, the ROM 103 and the RAM 102.

Also included in exemplary computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 109, also coupled to bus 108, can be a serial port for communicating with the cradle 60. Device 109 can also include an infrared communication port.

Figure 6:
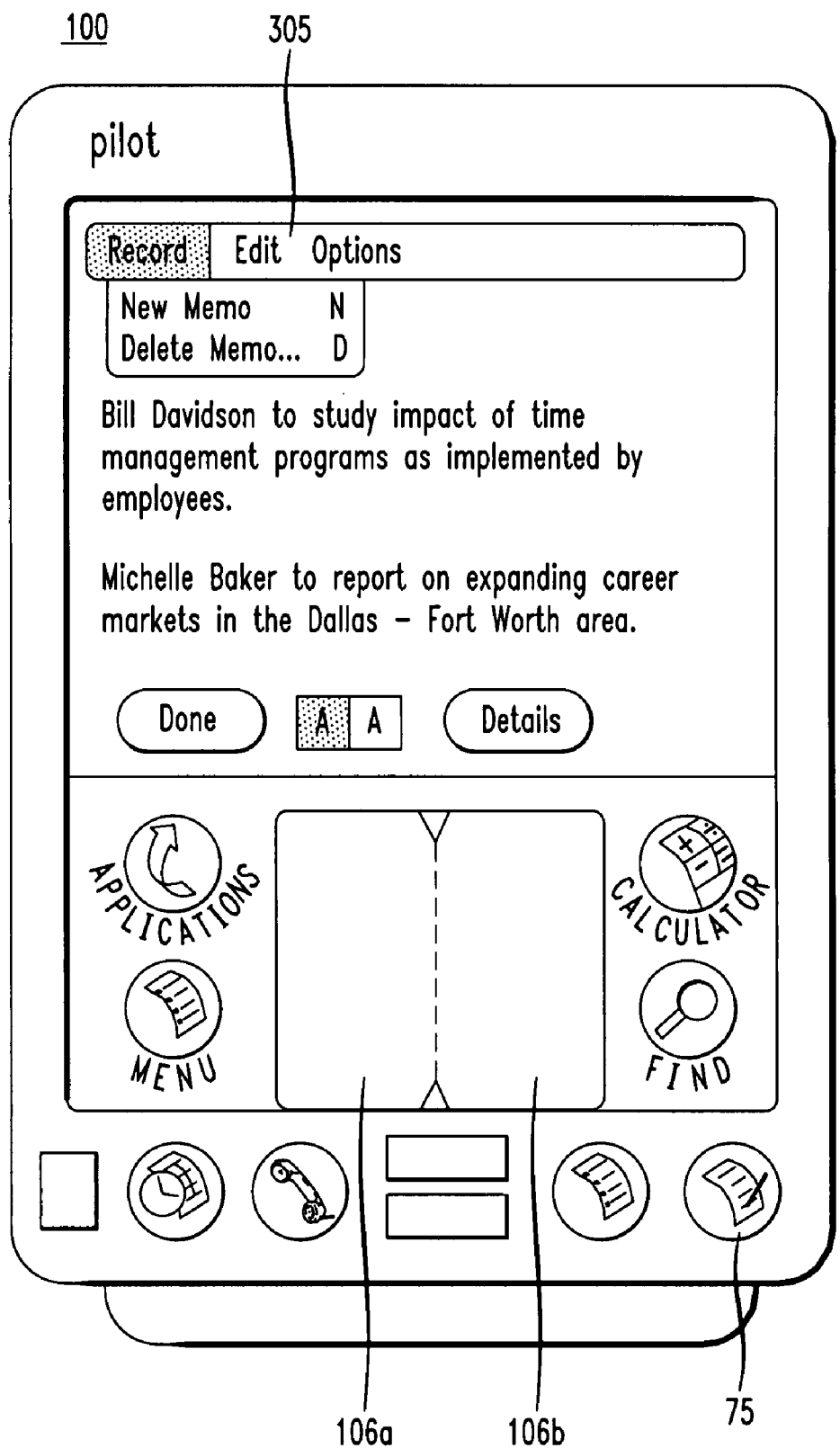
FIG. 6 is a front view of a palm top computer system illustrating the display screen, digitizer regions and an exemplary menu in accordance with the present invention.

FIG. 6 is a front view of the exemplary palmtop computer system 100 with a menu bar 305 open displaying a pull down window. Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the present invention is also operable within a single region that recognizes both alphabetic and numeric characters.

Figure 7:
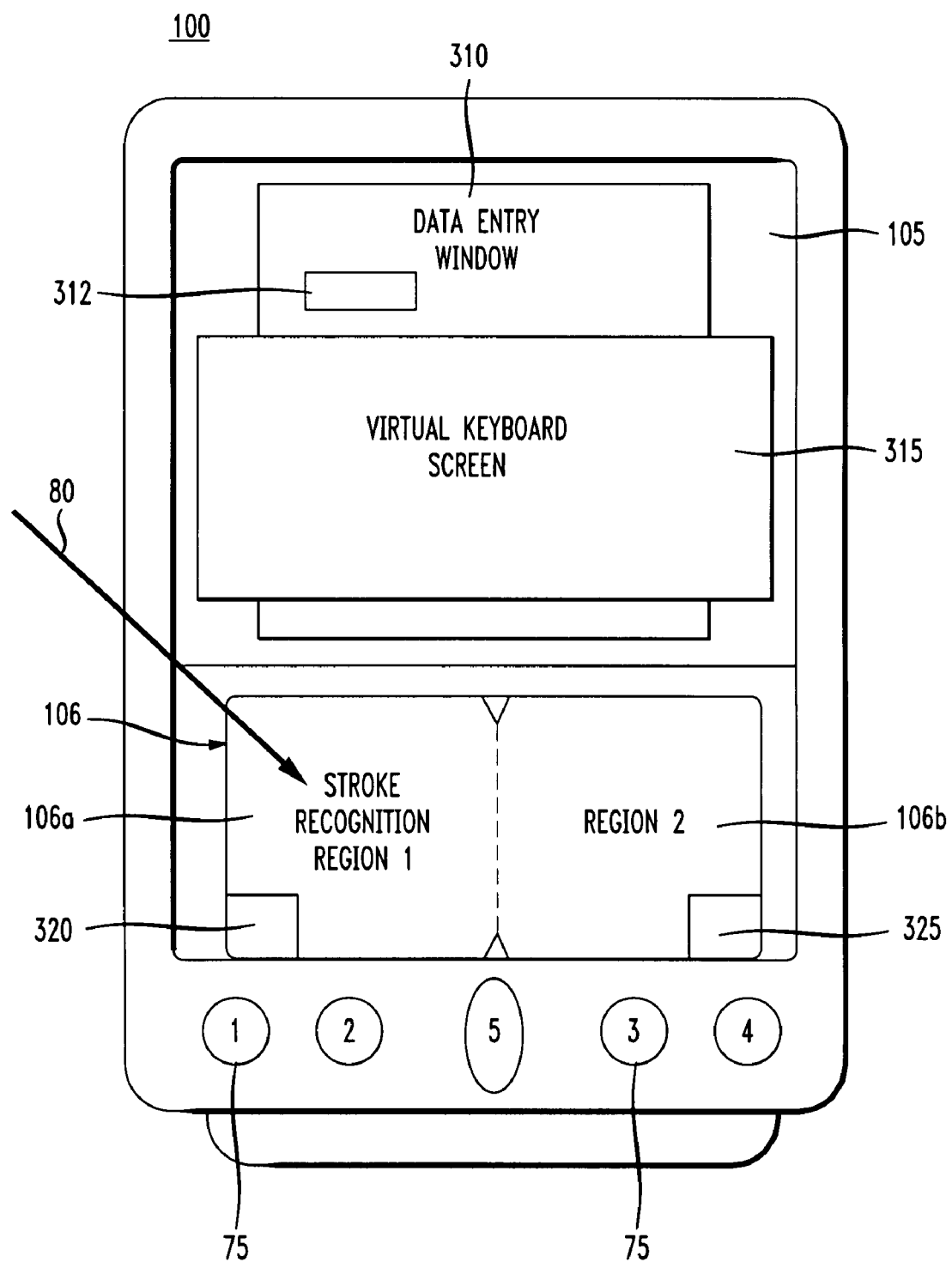
FIG. 7 illustrates a display screen showing a data entry window and a virtual keyboard window and also illustrates a handwriting recognition digitizer on the palmtop computer system.

FIG. 7 is a front view of the exemplary palmtop computer system 100 with several display windows open on-screen 105 including a virtual keyboard window 315. The user has the choice of displaying a virtual keyboard image on-screen 105 and entering characters by selecting one of the displayed characters of the virtual keyboard image. Window 310 is part of a generic application program executing on system 100. Window 310 is a data entry window in that the application program is requesting information to be entered by a user. The information requested and the application program could be any information and any program. Typically, data entry window 310 has at least one data entry field 312 for accepting character data therein. When not entering data using the virtual keyboard 315, the user can stroke a character within pad 106 (either region 106a or 106b) or on-screen 105. The recognized character is then also placed into the displayed data entry field for user verification and use. This process can be repeated.

It is appreciated that, in one embodiment, the digitizer region 106a and 106b is separate from the display screen 105 and therefore does not consume any display area.

Figure 8A:
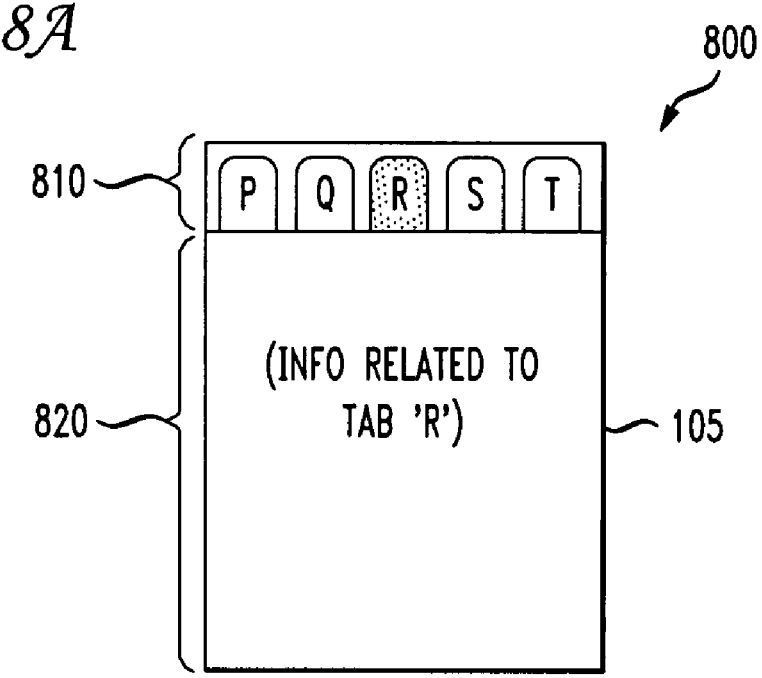
FIG. 8A depicts a tab-based GUI is presented in accordance with one embodiment of the present invention.

Automatic Tab Scrolling:

FIG. 8A depicts a tab-based GUI 800 that includes a tab display area 810 on display screen 105, and a tab-associated-information display area 820 on display screen 105. In the present embodiment, tabs are indexed by alphabets. However, other types of tab index such as file names can be used. Not all tabs can be displayed in tab display area 810. As such, the tabs can be classified into on-screen tabs and off-screen tabs. As shown, not all tabs are displayed. Rather, as shown in FIG. 8A, the only on-screen tabs are tabs 'P', 'Q', 'R', 'S', and 'T' being displayed in tab display area 810. These tabs can be selected by a user for entering into a file category associated with a selected tab. Specifically, a user can select an on-screen tab for displaying information related to the selected on-screen tab. This information is displayed in tab-associated-information display area 820.

Continuing with FIG. 8A, the center tab 'R' is shown highlighted to indicate that it is the most recently selected tab, or that it is the default tab. Additionally, tab-associated-information display area 820 displays the information related to tab 'R'. An example of tab-associated-information can be phone lists. Particularly, when tab 'R' is selected and thus highlighted, people's last name that begins with the letter 'R' would be displayed in tab-associated-information display are 820.

Figure 8B:
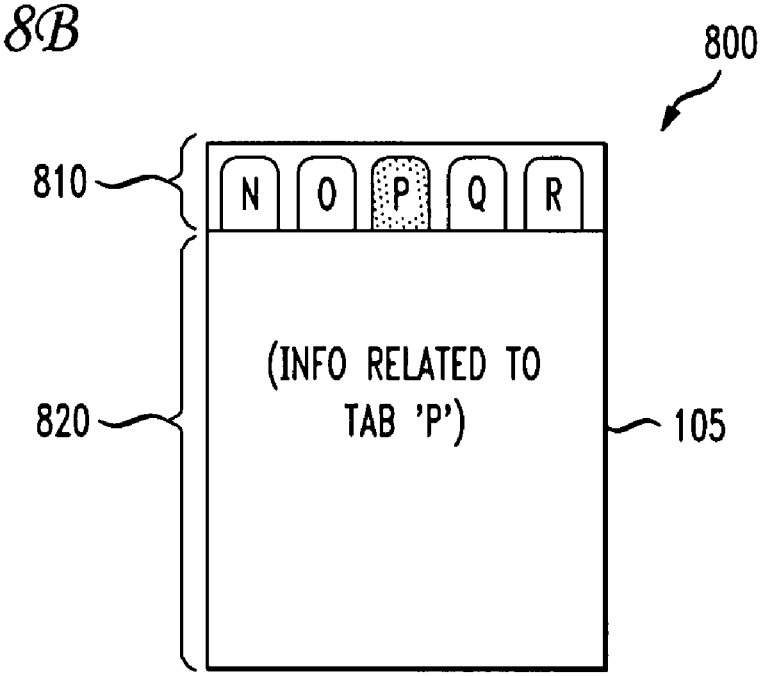
FIG. 8B depicts another view of the tab-based GUI presented in accordance with the embodiment depicted in FIG. 8A.

Referring now to FIG. 8B, the same tab-based GUI 800 is shown with a different set of on-screen tabs. Again, not all tabs are displayed in tab display area 810. Rather, as shown in FIG. 8B, the only on-screen tabs are tabs 'N', 'O', 'P, 'Q', and 'R' being displayed in tab display area 810. These on-screen tabs can be selected by a user for entering into a file category associated with a selected tab. A user can select an on-screen tab for displaying information related to the selected on-screen tab. This information is displayed in tab-associated-information display area 820.

Continuing with FIG. 8B, the center tab, tab 'P', is shown highlighted to indicate that it is the most recently selected tab, or that it is the default tab. Additionally, tab-associated-information display area 820 displays the information related to tab 'P'. An example of tab-associated-information can be phone lists. Particularly, when tab 'P' is selected and thus highlighted, people's last name that begins with the letter 'P' would be displayed in tab-associated-information display are 820.

Referring now to both FIGS. 8A and 8B, as understood herein, the selection of an on-screen tab need not be indicated through highlighting the tab. For example, in an alternative embodiment, the selected tab takes on a shape that is different from unselected tabs. In so doing, the selected tab indicates that it is being selected. Also, as understood herein, the selection of an on-screen tab can be performed in a variety of ways that include: by hand touch, by a stylus, by key board entry, etc. Moreover, a tab display area such as tab display area 810 need not be limited to the top of display screen 105. For example, in an alternative embodiment, a tab display area is located on the left side of display screen 105.

Figure 8C:
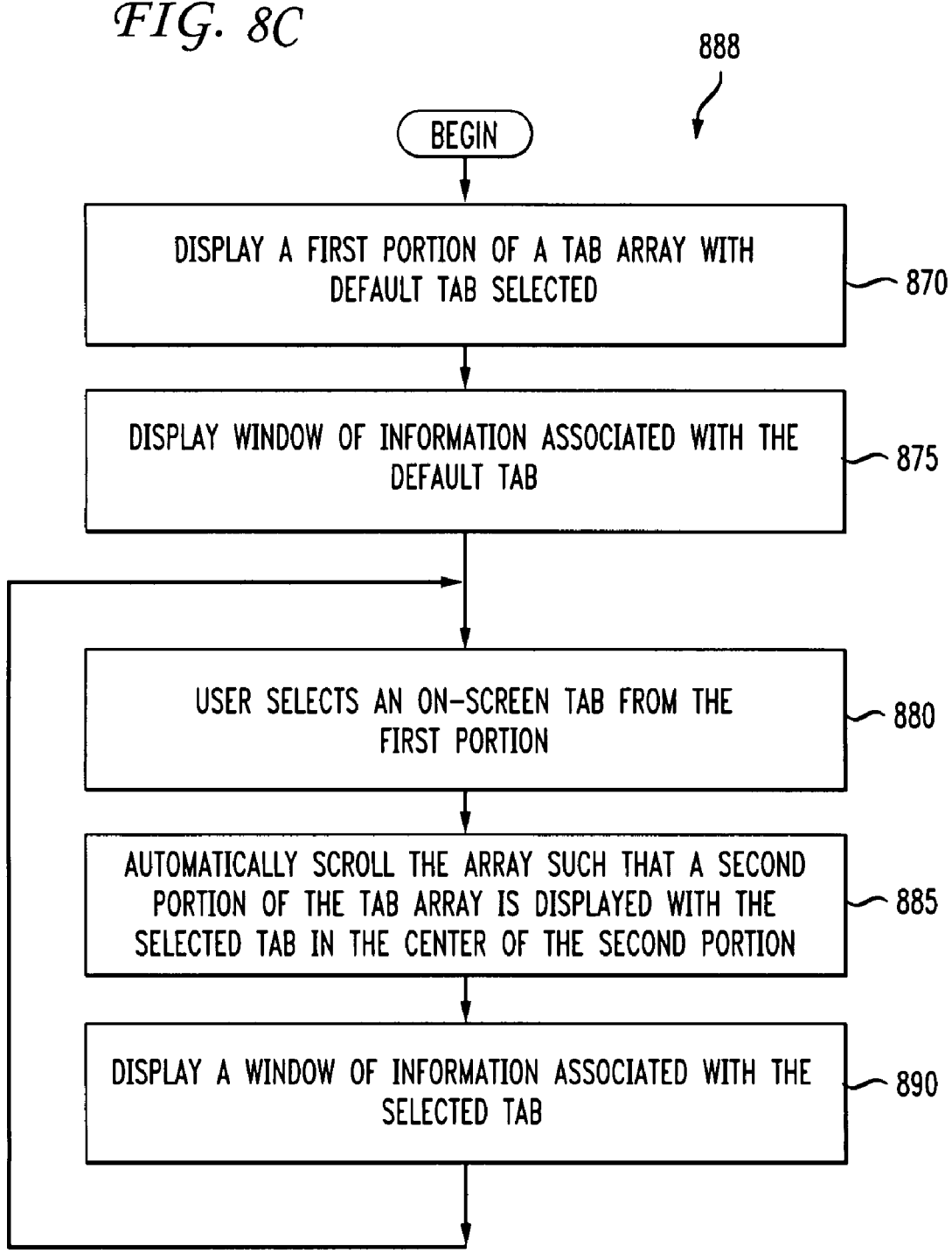
FIG. 8C is a flow chart outlining steps performed for automatic scrolling in accordance with one embodiment of the present invention.

Referring now to FIG. 8C, a flow chart 888 is shown outlining steps in one embodiment of the present invention.

In step 870, as many tabs as can fit across the top of the display screen are displayed as on-screen tabs wherein a default tab is selected. Specifically, on-screen tabs together with off-screen tabs are arranged as a tab array. When not all tabs can fit into a tab display area of the display screen, a portion of the tab array is displayed. As understood herein, tabs need not be fitted across the top of the display screen. For example, in an alternative embodiment, tabs are fitted across the left side of the display screen.

In step 875, a window of information associated with the default tab is displayed.

In step 880, user selects an on-screen tab from among the on-screen tabs.

In step 885, a different set of on-screen tabs are automatically scrolled into the tab display area, i.e., another portion of the tab array is displayed. Specifically, the user's selected tab is automatically scrolled and positioned in the center of the top side of the display screen.

In step 890, a window of information associated with the selected tab is displayed. In turn, step 880 is performed again.

Figure 9A:
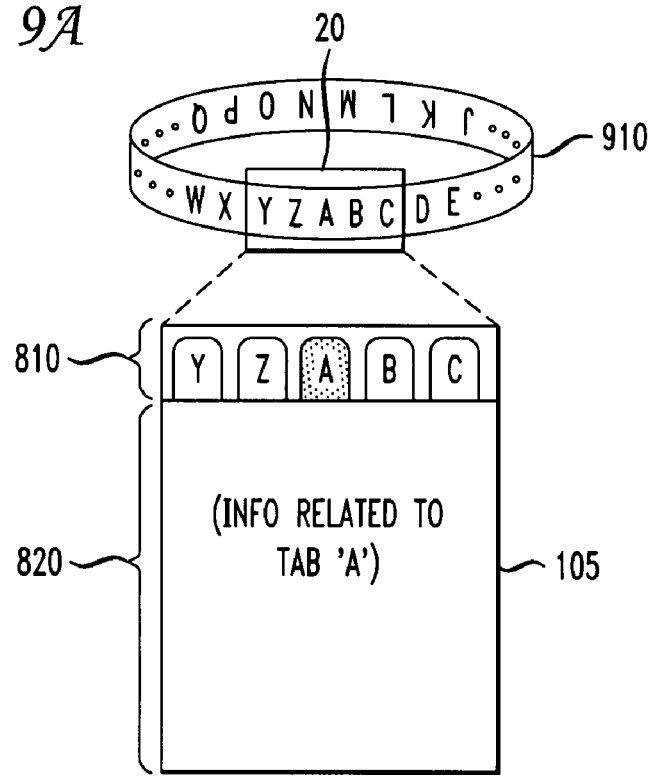
FIG. 9A depicts the manner in which tabs are conceptually arranged as a circular array for display in accordance with one embodiment of the present invention.

FIG. 9A depicts how tabs are conceptually arranged as a circular array 910 for display in accordance with one embodiment of the present invention. As shown, tabs that are indexed by the entire alphabets are conceptually arranged into circular array 910. As such 'A' is diametrically opposite-'N', 'B' is diametrically opposite 'O', 'Z' is diametrically opposite 'M' etc. Also because of circular array 810, once the end of the alphabet 'Z', is reached, 'A' is positioned next to 'Z' to repeat the alphabets again.

Continuing with FIG. 9A, a conceptual frame 920 is shown to include alphabets 'YZABC.' Specifically, conceptual frame 920 encloses alphabets that correspond to indices of the on-screen tabs. For example, as shown enclosed in conceptual frame 920, alphabets 'YZABC' correspond to the indices of the five tabs ('Y tab, 'Z' tab, 'A' tab, 'B' tab and 'C' tab) that are on-screen on the top side of display screen 105, namely tab display area 810.

Figure 9B:
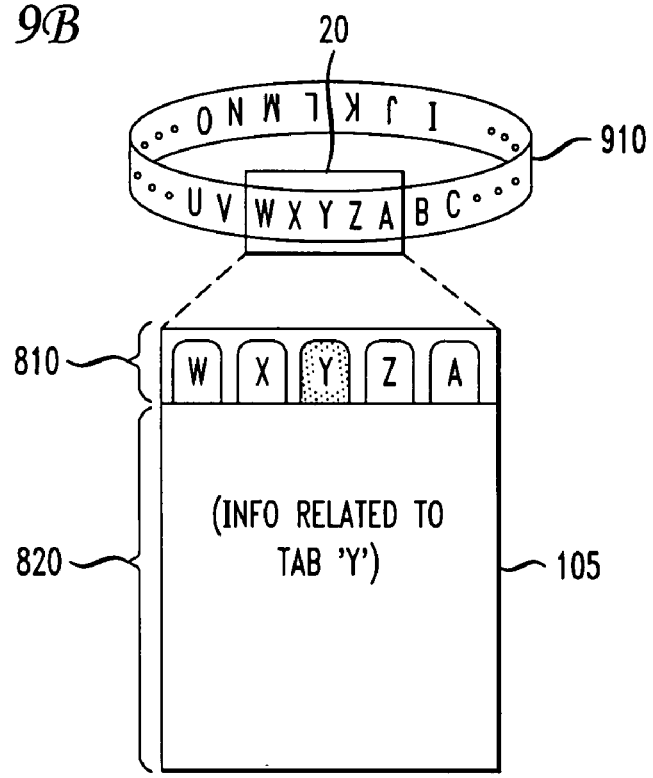
FIG. 9B depicts the manner in which tabs, in response to a newly selected tab on-screen, are conceptually arranged as a circular array for display in accordance with the embodiment presented in FIG. 8A.

FIG. 9B depicts how tabs, in response of a newly selected tab on screen, are conceptually arranged as circular array 910 for display in accordance with the embodiment presented in FIG. 9A. In response to the newly selected tab (in this case, 'Y' tab), conceptual frame 920 now encloses a different portion of circular array 910 wherein 'Y' is position in the center of conceptual frame 920. As shown enclosed in conceptual frame 820, 'WXYZA' correspond to the indices of the five tabs ('W' tab, 'X' tab, 'Y' tab, 'Z' tab and 'A' tab) that are on screen on the top side of display screen 105, namely tab display area 810.

Referring now to both FIGS. 9A and 9B, from a user's point of view, the selected 'Y' tab has been moved from the left-most position relative to the top side of display screen 105 (as shown in FIG. 9A) to the center position relative to the top side of display screen 105 (as shown in FIG. 9B). In effect, upon its selection, 'Y' tab is automatically scrolled to the center of the top side of display screen 105. However, automatic scrolling need not place the selected tab to the center of the top side of the display screen. For example, in an alternative embodiment, the selected tab is automatically scrolled to the right most position of the top side of display screen 105.

Moreover, still referring to both FIGS. 9A and 9B, any tab can be eventually displayed by repeating a simple procedure. That is, a user can just repeatedly select the left most tab on-screen until the desired tab is on-screen. Likewise, any tab can be eventually reached by repeatedly selecting the right-most tab on-screen until the desired tab is on-screen.

As understood herein, tabs do not need to be displayed on the top side of display screen 105. For example, in an alternative embodiment, tabs are displayed on the left side of display screen 105. That is, tab display area 810 can be on the left side of display screen 105.

Figure 10:
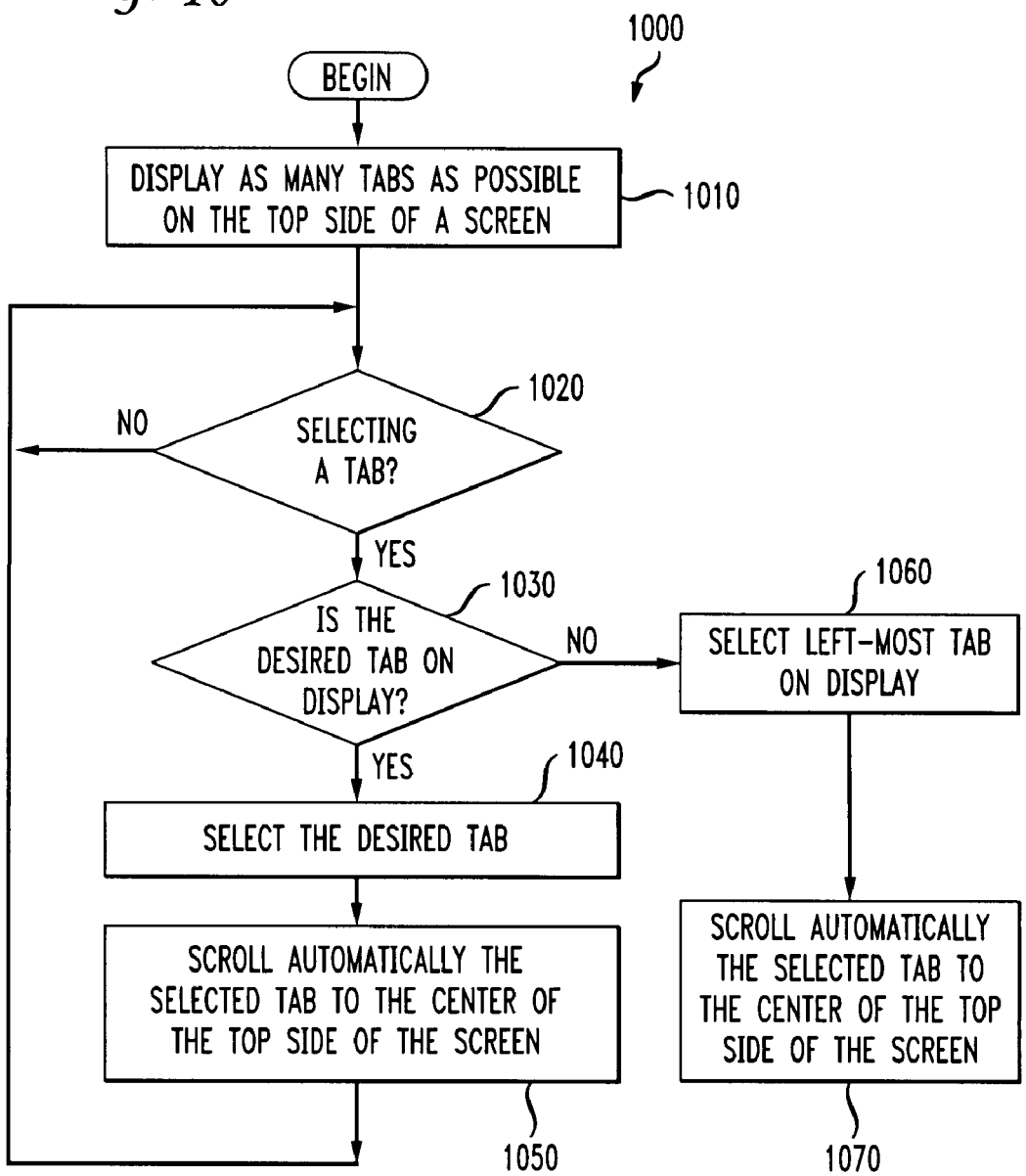
FIG. 10 is a flow chart outlining steps performed for automatic scrolling in accordance with one embodiment of the present invention.

FIG. 10 is a flow chart 1000 outlining steps performed for automatic scrolling in accordance with one embodiment of the present invention.

In step 1010, as many tabs as possible are displayed on the top side of a screen of a computer system. The computer system in the present embodiment is a handheld device such as a cell phone or a PDA. As understood herein, tabs need not be fitted across the top of the display screen. For example, in an alternative embodiment, tabs are displayed across the left side of the display screen.

In query step 1020, if no tab is to be selected, then query step 1020 is performed again. Otherwise, if a tab is to be selected, then query step 1030 follows.

In query step 1030, if the desired tab is not on-screen on the top side of the screen, then step 1060 is performed.

In step 1060, the left-most tab on-screen is selected.

In step 1070, the selected left-most tab is automatically scrolled to the center of the top side of the screen. Then, query step 1030 is performed again. As understood herein, in an alternative embodiment, step 1060 and step 1070 can be performed by selecting the right-most tab instead of selecting the left-most tab.

In query step 1030, if the desired tab is on-screen on the top side of the screen, then step 1040 is performed.

In step 1040, the desired tab is selected.

In step 1050, the selected desired tab is automatically scrolled to the center of the top side of the screen. Then query step 1020 is performed again.

Figure 11A:
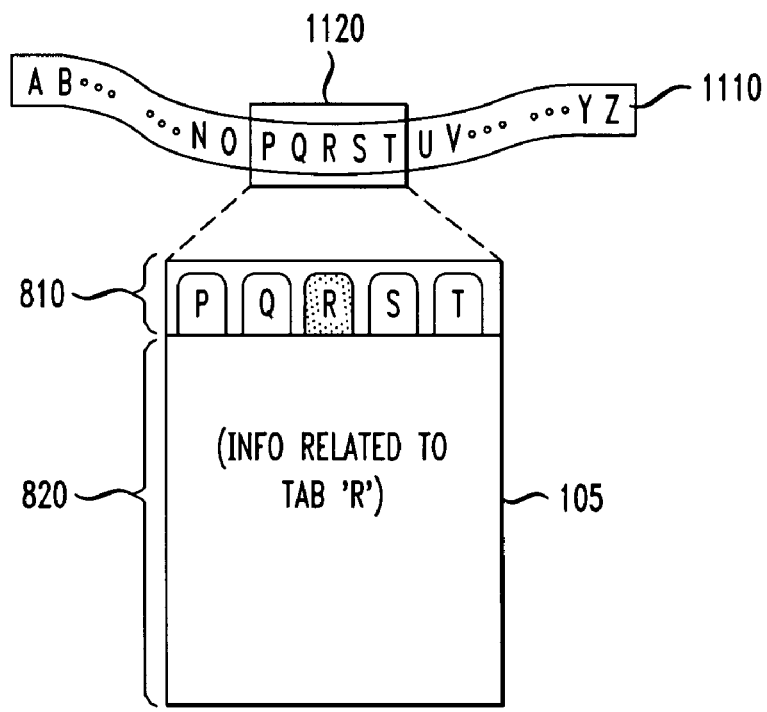
FIG. 11A depicts the manner in which tabs are conceptually arranged as a linear array for display in accordance with one embodiment of the present invention.

FIG. 11A depicts how tabs are conceptually arranged as a linear array for display in accordance with one embodiment of the present invention. As shown, tabs that are indexed by the entire alphabets are conceptually arranged into linear array 1110. As such 'A' is positioned at the beginning of linear array 1110. 'A' is followed by 'B', 'C', and so on until 'Z' as the end of linear array 1110. In contrast to circular array 910 of FIGS. 9A and 9B, 'A' within linear array 1110 is not positioned next to 'Z' to repeat the alphabets again.

Continuing with FIG. 11A, a conceptual frame 1120 is shown to include alphabets 'PQRST'. Specifically, conceptual frame 1120 encloses alphabets that correspond to indices of the tabs on-screen. For example, as shown enclosed in conceptual frame 1120, alphabets 'PQRST' correspond to the five tabs ('P' tab, 'Q' tab, 'R' tab, 'S' tab and 'T' tab) that are on-screen on the top side of display screen 105, namely tab display area 810.

Figure 11B:
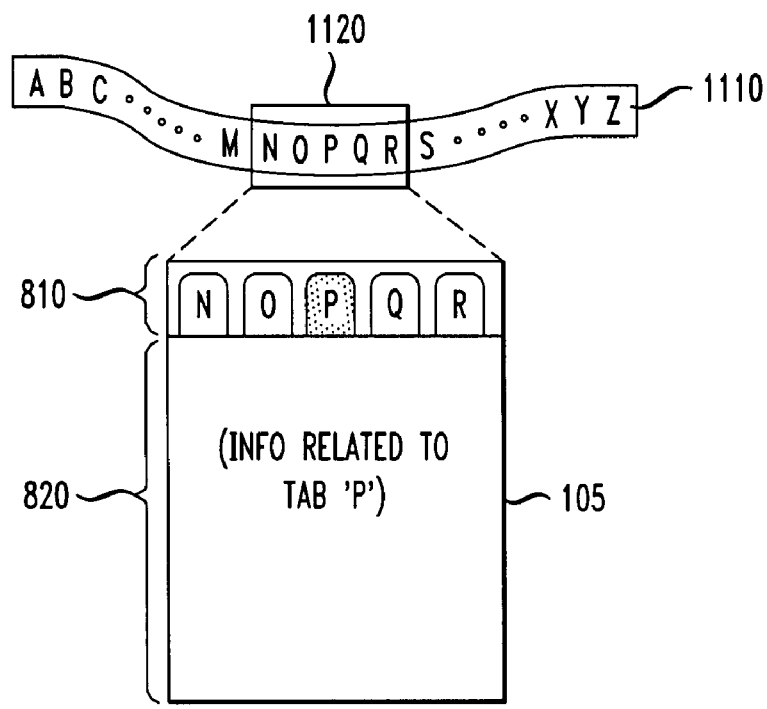
FIG. 11B depicts the manner in which tabs, in response to a newly selected tab on-screen, are conceptually arranged for display as a linear array in accordance with the embodiment presented in FIG. 10A.

FIG. 11B depicts how tabs, in response of a newly selected tab on-screen, are conceptually arranged as linear array 1110 for display in accordance with the embodiment presented in FIG. 11A. In response to the newly selected tab ('P' tab in this case), conceptual frame 1120 now encloses a different portion of linear array 1110 wherein 'P' is positioned in the center of conceptual frame 1120. What are enclosed in conceptual frame 1120 (i.e., 'NOPQR') correspond to the indices of the five tabs ('N' tab, 'O' tab, 'P' tab, 'Q' tab and 'R' tab) that are on-screen on the top side of display screen 105, namely tab display area 810.

Referring now to both FIGS. 11A and 11B, from a user's point of view, the selected 'P' tab has been moved from the left-most position relative to the top side of display screen 105 (as shown in FIG. 11A) to the center position relative to the top side of display screen 105 (as shown in FIG. 11B). In effect, upon its selection, 'P' tab is automatically scrolled to the center of the top side of display screen 105, namely tab display area 810.

Moreover, still referring to both FIGS. 11A and 11B, any tab can be eventually displayed by repeating a simple procedure. That is, a user can just repeatedly select either the left-most or the right-most tab on screen until the desired tab is on screen for selection.

Figure 11C:
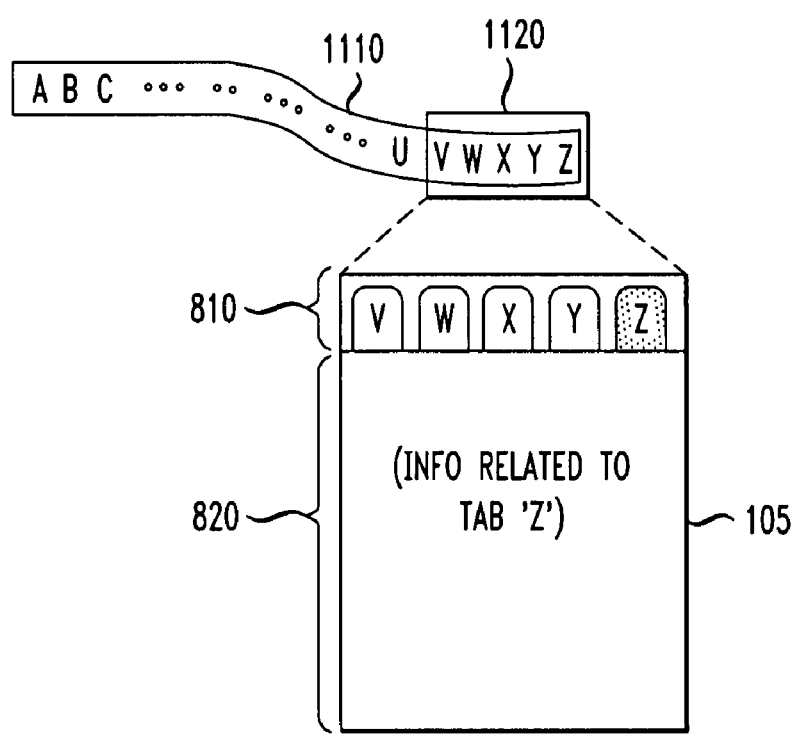
FIG. 11C depicts a scenario wherein the selected tab is not scrolled automatically to the center of the tab display area in accordance with one embodiment of the present invention.

Referring now to FIG. 11C, a scenario is depicted wherein the selected tab is not scrolled automatically to the center of tab display area 810. In particular, as shown, in response to the newly selected tab (in this case, 'Z' tab), conceptual frame 1120 now encloses a different portion of linear array 1110. What are enclosed in conceptual frame 1130 (i.e., 'VWXYZ') correspond to the indices of the five tabs ('V' tab, 'W' tab, 'X'0 tab, 'Y' tab and 'Z' tab) that are on-screen on the top side of display screen 105, namely tab display are 810.

Continuing with FIG. 11C, 'Z' tab is not positioned at the center but rather at the very right end of tab display area 810. 'Z' tab is not automatically scrolled to the center of tab display area 810 because 'Z' as an alphabet is situated at the end of linear array 1110, wherein no more alphabet continues to the right side of 'Z'. Thus, in order to display as many on-screen tabs as possible, 'Z' tab is automatically scrolled to the very right end of tab display area 810 such that 'V' tab, 'W' tab, 'X' tab, 'Y' tab and 'Z' tab are displayed in tab display area 810.

As understood herein, tabs do not need to be displayed on the top side of display screen 105. For example, in an alternative embodiments, tabs are displayed on the left side of display screen 105. That is, tab display area can be on the left side of display screen 105.

In summary, advantageously, the present invention provides a tab-based GUI that does not leave a "large footprint" on the display screen of a handheld device. The present invention further provides a GUI tailored to a handheld device's display screen to select any category efficiently without relying on scrolling an entire screen width at once. The present invention also provides a GUI tailored to a handheld device's display screen without using small elements that are difficult to activate by stylus or mouse.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. The scope of the invention is intended to be defined by the Claims appended hereto and their equivalents.

What is claimed is:

1. For a handheld device, a method for presenting a tab-based graphic user interface having more tabs than can fit across a screen side, said method comprising the steps of:
   a) displaying as many tabs on a touch sensitive display of a handheld device as can fit across a length of said screen side as on-screen tabs, said on-screen tabs arranged in a sequence on the screen side wherein each of said on-screen tabs are adapted to be selected by a user for displaying information related to a selected tab; and
   b) in response to the selection of a first on-screen tab by contact with said touch sensitive display, automatically scrolling said sequence of tabs such that said first on-screen tab is positioned in a designated position of said screen side and wherein off-screen and said on-screen tabs form an array, and wherein said designated position is one of a right most position of said screen side, a left most position of said screen side and a center of said screen side;
c) displaying information related to said first on-screen tab;
d) transforming the on-screen tab into a different shape when said on-screen tab is selected; and
e) scrolling the tabs by repeatedly selecting one of the right-most tab and the left most tab on the screen.

2. The method of claim 1, further comprising the step of:
in response to selection of a second on-screen tab, automatically scrolling said sequence of tabs such that said second on-screen tab is displayed in said designated position.

3. The method of claim 1, wherein said designated position is disposed approximately in the center of said screen side.

4. The method of claim 1, wherein said designated position is disposed approximately toward the right-most position of said screen side.

5. The method of claim 1, wherein said designated position is disposed approximately toward the left-most position of said screen slide.

6. The method of claim 1, wherein said off-screen and said on-screen tabs form a circular array such that the portion of said circular array being displayed on the screen dimension contains at its center the last-selected tab.

7. The method of claim 1, wherein off-screen and said displayed tabs form a linear array such that a portion of said linear array being displayed is said sequence of said on-screen tabs.

8. The method as recited in claim 1, wherein said computer system is a personal digital assistant (PDA) device.

9. The method as recited in claim 1, wherein said computer system is a cellular phone.

10. A handheld device with a memory storing therein computer code executed by said handheld device to perform the steps comprising:
a) displaying as many tabs on a touch sensitive display of a handheld device as can fit across a length of said screen side as on-screen tabs, said on-screen tabs arranged in a sequence on the screen side wherein said on-screen tabs are adapted to be selected by a user for displaying information related to a selected tab; and
b) in response to the selection of a first on-screen tab by contact said touch sensitive display with a stylus, automatically scrolling said sequence of tabs such that said first on-screen tab is positioned in a designated position of said screen side, and wherein off-screen and said on-screen tabs form an array, and wherein said designated position is one of a right most position of said screen side, a left most position of said screen side and a center of said screen side;
c) displaying information related to said first on-screen tab;
d) transforming the on-screen tab to a different shape when said on-screen tab is selected; and
e) scrolling the tabs by repeatedly selecting one of the right-most tab and the left most tab on the screen.

11. The handheld device of claim 10, further performing the step of:
in response to selection of a second on-screen tab, automatically scrolling said second on-screen tab to said designated position.

12. The handheld device of claim 10, wherein said designated position is disposed approximately in the center relative to said screen side.

13. The handheld device of claim 10, wherein said designated position is disposed approximately toward the right-most position of said screen side.

14. The handheld device of claim 10, wherein said designated position is disposed approximately toward the left-most position of said screen side.

15. The handheld device of claim 10, wherein off-screen and said on-screen tabs form a circular array such that a portion of said circular array being displayed is said sequence of said on-screen tabs.

16. The handheld device of claim 10, wherein off-screen and said on-screen tabs form a linear array such that a portion of said linear array being displayed is said sequence of said displayed tabs.

17. The handheld device of claim 10, wherein said handheld device is a PDA.

18. The handheld device of claim 10, wherein said handheld device is a cellular phone.

19. For a handheld device, a computer readable medium having stored therein computer readable code for causing said handheld device to perform the steps of:
a) displaying as many tabs on a touch screen sensitive display of a handheld device as can fit across a length of said screen side as on-screen tabs, said on-screen tabs arranged in a sequence on the screen side wherein each of said on-screen tabs are adapted to be selected by a user for displaying information related to a selected tab;
b) in response to the selection of a first on-screen tab by contacting said touch sensitive display with a stylus, automatically scrolling said sequence of tabs such that said first on-screen tab is positioned in a designated position of said screen side and wherein off-screen and said on-screen tabs form an array, and wherein said designated position is one of a right most position of said screen side, a left most position of said screen side and a center of said screen side;
c) displaying information related to said first on-screen tab;
d) transforming the on-screen tab to a different shape when said on-screen tab is selected; and
e) scrolling the tabs by repeatedly selecting one of the right-most tab and the left most tab on the screen.

20. The computer readable medium of claim 19, further causing said handheld device to perform the step of:
in response to selection of a second on-screen tab, automatically scrolling said second on-screen tab to said designated position.

21. The computer readable medium of claim 19, wherein said designated position is disposed approximately in the center of said screen side.

22. The computer readable medium of claim 19, wherein said designated position is disposed approximately toward the right-most position of said screen side.

23. The computer readable medium of claim 19, wherein said designated position is approximately toward the left-most position of said screen side.

24. The computer readable medium of claim 19, wherein off-screen and said on-screen tabs form a circular array such that a portion of said circular array being displayed is said sequence of said on-screen tabs.

25. The computer readable medium of claim 19, wherein off-screen and said on-screen tabs form a linear array such that a portion of said linear array being displayed is said sequence of said displayed tabs.

26. The computer readable medium of claim 19, wherein said handheld device is a PDA.

27. The computer readable medium of claim 19, wherein said handheld device is a cellular phone.

* * * * *